Patented Mar. 9, 1954

2,671,744

UNITED STATES PATENT OFFICE 2,671,744

SIZED STRANDS AND METHOD OF MAKING SAME

Lawrence P. Biefeld, Granville, and Joseph P. Stalego, Newark, Ohio, assignors to Owens-Corning Fiberglas Corporation, Toledo, Ohio, a corporation of Delaware No Drawing. Application February 9, 1951, Serial No. 210,280

4 Claims. (Cl. 154—91)

This invention relates to the production of fibrous glass products and it relates more particularly to the treatment of glass fibers in the manufacture of strands, yarns and the like.

In the manufacture of strands and yarns of glass fibers, hundreds of glass fiber filaments are brought together, preferably in conjunction with the fiber-forming operation. As the filaments are brought together in forming or otherwise, a size is usually applied to the surfaces, as by a roll applicator. The size is adapted to impart lubricity for enabling relative movement as between glass fiber filaments during flexure or as between glass fibers and other surfaces during processing without causing fiber destruction. At the same time, the size has the additional function of binding the filaments in the strand or yarn with sufficient strength to prevent separation during subsequent processing and to reduce the amount of loose or fuzzy ends.

It has been difficult to size glass fibers in yarn or strand formation with a composition capable of the desired balance of lubricity and adhesion whereby the strand or yarn or the fiber prepared therefrom is characterized by toughness and high abrasion resistance.

Because of the hydrophilic characteristics that predominate on the smooth, non-absorbent glass fiber surfaces, it has been difficult to color glass fibers in a manner which resists loss of color as an incidence to normal use, especially under high humidity conditions or washing.

It is an object of this invention to produce glass fibers in strand or yarn form sized with a composition which imparts a desired balance of lubricity and adhesion.

Another object is to produce glass fibers in strand or yarn form sized with a composition which markedly improves the toughness and the abrasion resistance of the strand, yarn of textile fabric produced therefrom.

A further object is to produce glass fibers in strand, yarn, or textile form sized with a composition which provides a base for permanent coloring of the glass fibers.

Another object is to provide glass fibers treated in forming with a single composition that imparts characteristics of high strength, colorability, and lubricity and adhesion in the desired balance.

In brief, the objects of this invention are achieved by the treatment of glass fibers with a composition, the solids of which consist essentially of a flexible, oil-soluble, polyamide resin in combination with nitrocellulose.

The desired characteristics are achieved by the use of a polyamide resin compounded by the reaction of a dimerized or trimerized fatty acid of 10 to 20 carbon length, such as linoleic acid and linolenic acid with a polyamine, preferably a diamine such as ethylene diamine, tetramethylene diamine, hexamethylene diamine, octamethylene diamine, propylene diamine, and the like.

The polyamide itself is incapable of imparting improvement in abrasion resistance unless it is incorporated with nitrocellulose, as will be apparent from the test results which will be hereinafter set forth. It is only when the polyamide is modified with nitrocellulose in amounts ranging from 1 to 15 percent by weight of the polyamide that a size having sufficient toughness and abrasion resistance is secured to provide a marked improvement of results obtained by other treatments. The composition of the nitrocellulose suitable for use with the polyamide is not particularly critical. Most nitrocellulose compounds are substantially similar chemically but differ in degree of nitration. As measured by viscosity, it is preferred to make use of ss. ½ second nitrocellulose.

The treating composition may be applied as a size to the glass fiber surfaces from solvent solution employing alcohols, such as propyl alcohol, cyclohexanol isopropyl alcohol, butanol, n-butyl alcohol, amyl alcohol, methyl isobutyl alcohol and the like as the principal solvent. It is possible to modify the diluent for the purpose of reducing cost and for better vaporization characteristics with hydrocarbons, such as toluene, xylene, V. M. & P. naphtha and the like. Acetone and other ketones and esters, such as butyl cellosolve, ethyl acetate and the like, may be used as the solvent medium as well as chlorinated solvents such as methyl chloride, ethylene dichloride, trichlorethylene and the like. From solvent solution, concentrations ranging from 2 to 20 percent by weight solids may be employed as the treating composition. One or more, and as many as 20 applications may be separately made in the event that a heavier weight is desired. Each application is usually followed by an air dry, but drying may be accelerated by exposure to elevated temperatures. However, final treatment is preferably achieved by heating the coated fibrous strand or fabric to elevated temperatures in the range of 100° F. to 200° F. for 1 to 15 minutes.

Application from solvent system may be made onto the glass fiber filaments or upon strands or slivers of glass fibers which may be twisted or untwisted, braided or unbraided, in the form of a textile or in the form of a sleeving or cable or the like. Application may be made by a colorcoating process, by spraying, or simply by passing the fiber filaments or bundles through a bath of the treating composition containing the polyamide and nitrocellulose in desired proportion.

By way of illustration, a treating composition formulated of 18 percent by weight polyamide prepared by the reaction of dimerized and trimerized linoleic and linolenic acids with ethylene diamine is combined with 2 percent by weight ss. ½ second nitrocellulose. In preparation of the composition, the nitrocellulose should be separately dissolved in 8 percent by weight acetone while the polyamide should be separately dissolved in a combination of solvents including 22 percent isopropyl alcohol and 50 percent by weight toluene. Solutions may then be combined to form the treating composition.

Glass fiber braid dipped 15 times in the above composition and followed by a short air dry after each dip, and then a final bake at about 150° F. for 5 minutes, has an abrasion resistance that withstands 335 strokes of a standard abrasion tester. Glass fiber braid of the same structure, but given a comparable treatment with polyamide alone, was only able to withstand 36 strokes. The excellent abrasion resistance developed by the described treatment is to be compared to the value of 135 strokes for treatment under the same conditions with a composition based on ethyl cellulose, 25 strokes for treatment based on polyvinylidene chloride, 22 strokes for treatment under the same conditions with a composition based upon the mixture of polyamide resin with paraffin, 23 strokes for treatment with a composition based on a polyacrylic ester, 27 strokes with a polyamide-piccolyte treatment, and 181 strokes with plain untreated cotton braid.

The combination of a flexible oil-soluble polyamide resin and nitrocellulose in proportion of 95 parts polyamide to 5 parts ½ second nitrocellulose may be applied advantageously as a hot melt onto the glass fiber filaments in forming as by means of a roll applicator or by a wiper pad. Application generally is made as the fibers are attenuated from hundreds of molten glass streams, issuing simultaneously from a bushing of a melting surface and gathered into a strand. By this technique, as much as 30 percent by weight of the treating composition may be applied to the surfaces of the glass fibers in a single application. Application to the filaments in forming is preferably made by way of a hot melt in order to deposit sufficient solids in a single treatment. In the event that less of the size can be tolerated on the fiber surfaces, or in the event that subsequent treatments can be made one after another, application in forming may also be made from solvent solution or aqueous dispersion.

The combination of polyamide resin with such small amounts of nitrocellulose does not provide a flammable composition. It is possible in a system of the type described to incorporate tinctorial agents, such as dyes and pigments, to impart permanent color of the desired character onto the glass fiber surfaces. Instead of incorporating the coloring medium as a part of the treating composition, permanent color may also be achieved by dyeing the glass fiber surfaces, sized or treated in the manner described subsequent to such treatment by hot melt or from solvent solution. In the treatment of already formed strands, it is preferred to remove the size before treatment, as by burning off or by washing. In some instances, improved results are secured even when the other size first applied is allowed to remain. Excellent results have been secured from the treatment of glass fibers wherein the size, such as gelatin, starch, and the like, and combinations thereof are allowed to remain and when such size is first reacted for insolubilization with formaldehyde.

It will be apparent from the description that this invention provides a new and improved sized glass fiber having greatly improved strength and abrasion resistance, thereby increasing its ability as a reinforcement or as a basic fiber for use in the textile art. The treating composition adheres strongly to the glass fiber surfaces and its adherence is substantially unaffected by water or high moisture conditions such that the established relationship becomes of substantially permanent character. Since tinctorial agents may be incorporated with the treating composition, or introduced by an after treatment, it will be apparent that uniform and permanent color may be embodied in the glass fiber fabric in a manner to overcome one of the difficulties inherent in such materials.

It will be understood that changes may be made in composition and the technique or its application to the glass fiber surfaces without departing from the spirit of the invention, especially as defined in the following claims.

We claim:

1. In the method of sizing glass fibers the step comprising coating the glass fiber filaments in advance of their being gathered into a strand in forming with a solution containing 2–20 percent by weight of a composition consisting essentially of 99–85 parts by weight of a polyamide formed by the reaction between dimerized and trimerized fatty acids and diamines and 1–15 parts by weight nitrocellulose and gathering the coated glass fiber filaments into a bundle to form a strand.

2. In the method of sizing glass fibers to increase their abrasion resistance the steps comprising coating glass fiber filaments in advance of their being gathered into strands in forming with a hot melt consisting essentially of 99–85 parts by weight polyamide of the type formed by dimerized and trimerized fatty acids and diamines and 1–15 parts nitrocellulose and gathering the coated glass fiber filaments to form a strand.

3. Strands formed of a plurality of glass fiber filaments in which the individual glass fiber filaments are coated with the composition formed of a polyamide produced by the reaction of dimerized and trimerized fatty acids with diamines and nitrocellulose present in the ratio of 99 to 85 parts by weight of the polyamide to 1 to 15 parts by weight of nitrocellulose to impart a desirable balance between lubricity and bonding between the glass fiber filaments and to protect the glass fiber surfaces against destruction by abrasion.

4. The method of sizing glass fibers in the form of strands in which the glass fiber filaments are originally coated with a size comprising the steps of removing the original size from the surfaces of the glass fiber filaments, and then immediately impregnating the strands of glass fiber to coat the individual filaments with a composition containing 2 to 20 percent by weight of a polyamide formed by the reaction of dimerized and trimerized fatty acids with diamines and nitrocellulose present in the ratio of 99 to 85 parts by weight of the polyamide to 1 to 15 parts by weight of nitrocellulose, and heating the coated filaments to set the size on the glass fiber surfaces.

LAWRENCE P. BIEFELD.
JOSEPH P. STALEGO.

References Cited in the file of this patent

UNITED STATES PATENTS

| Number | Name | Date |
|---|---|---|
| 2,359,877 | Schupp | Oct. 10, 1944 |

OTHER REFERENCES

Cowan: Oil and Soap, vol 21, April 1944, pages 101–107.

Modern Polyamide Resins, A. G. Hovey, May 1945, pp. 125, 126, 192.